United States Patent [19]
Wheland et al.

[11] Patent Number: 4,912,175
[45] Date of Patent: Mar. 27, 1990

[54] PROCESS FOR IN CREASING POLYAMIDE MOLECULAR WEIGHT WITH P CONTAINING CATALYST

[75] Inventors: Robert C. Wheland; Ivan K. Miller, both of Wilmington, Del.

[73] Assignee: E. I. Du Pont de Nemours and Company, Wilmington, Del.

[21] Appl. No.: 227,035

[22] Filed: Aug. 1, 1988

[51] Int. Cl.$^4$ .............................................. C08G 69/48
[52] U.S. Cl. ...................................... 525/420; 525/419
[58] Field of Search ................................ 525/420, 419

[56] References Cited

U.S. PATENT DOCUMENTS

| | | | |
|---|---|---|---|
| 3,365,428 | 1/1968 | Wujciak | 260/78 |
| 3,509,107 | 4/1970 | Brigmac | 260/78 |
| 3,763,113 | 10/1973 | Burrows et al. | 260/78 |
| 3,825,508 | 7/1974 | Ashida et al. | 260/78 |
| 3,944,518 | 3/1976 | Burrows et al. | 260/78 |
| 4,390,667 | 6/1983 | Aharoni et al. | 525/420 |
| 4,433,116 | 2/1984 | Largman et al. | 525/420 |

FOREIGN PATENT DOCUMENTS 1193435  6/1970  United Kingdom .

Primary Examiner—Harold D. Anderson

[57] ABSTRACT

In a process for increasing the molecular weight of a polyamide, e.g., nylon-6,6, comprising heating the polyamide in the presence of a catalyst to effect a desired molecular weight change, the improvement which comprises employing, as the catalyst, (A) $R^1(CH_2)_nPO_3R_2^2$ and $R^1(CH_2)_nPO_2HR^2$ where $R^1$ is 2-pyridyl, $NHR^4$ or $NR_2^4$ or $NH_2$, n is an integer of from 2 to 5 inclusive, $R^2$, being the same or different, is H or $C_xH_{2x+1}$, $R^4$, being the same or different, is $C_xH_{2x+1}$, and x is an interger of from 1 to 10 inclusive; and (B) $R^3X(CH_2)_{n'}PO_3R_2^2$ and $R^3X(CH_2)_{n'}PO_2HR^2$ where X is S or O, n' is an integer of from 2 to 5 inclusive, $R^3$ is H or $C_xH_{2x+1}$, x is an integer of from 0 to 10 inclusive and $R^2$ is defined as in formula (A).

24 Claims, No Drawings

PROCESS FOR INCREASING POLYAMIDE MOLECULAR WEIGHT WITH P CONTAINING CATALYST

FIELD OF THE INVENTION

This invention relates to polyamides, especially nylon, and more particularly to a method for increasing the molecular weight of such polyamides.

BACKGROUND OF THE INVENTION

It is conventional in the production of polyamides, especially nylon, to subject the polyamide to treatment with a catalyst in order to increase the molecular weight of the polyamide, the process being termed "amidation". The general reaction involved in nylon amidation is the formation of an amide bond by the reaction of terminal carboxylic and amino groups of the polymer, with the process being generally conducted at an elevated temperature, particularly near the melting point of the polymer, in the presence of the catalyst. Such a process is described in U.S. Pat. No. 3,763,113 wherein the catalyst is a phosphonic acid of the formula:

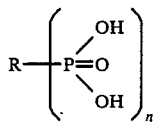

wherein n is 1, 2 or 3, and $R^1$ is a mono-, di- or tri-valent organic radical depending on the value of n.

The patent states that the organic radicals represented by R, which are attached to the phosphorus atom through a carbon atom of said radical, are preferably mono-, di- or tri-valent aliphatic, cycloaliphatic, aryl, aralkyl or aralkenyl radicals, or such radicals in which a carbon atom is replaced by a hetero atom, in particular the nitrogen atom. It is most preferred that the organic radical be a lower alkyl, a cyclohexyl, a monocyclic aryl lower alkyl or a monocyclic aryl radical. Of all the examples in the patent, the only example of an organic radical wherein R contains a hetero atom is Example 8, employing 1-piperidinophosphonic acid.

In another patent by the same inventors, Burrows et al, U.S. Pat. No. 3,944,518, the combination of a phosphonic acid salt with an organic diamine is employed in order to increase the polymerization rate as well as to provide a polymer of improved whiteness. Mostly all of the examples utilize cyclohexylphosphonic acid, but in Example 12, part (d), there is an incidental experiment of β-(ethylamino)-ethylphosphonic acid being employed in conjunction with hexamethylene diamine.

In French patent No. 1,531,145, corresponding to British 1,193,435, the use of alkali and alkaline earth metal salts of a phosphonic acid is disclosed to produce high molecular weight nylon-6,6 and 6,8. Among the acids used to make the salts is p-methoxyphenylphosphonic acid.

Also, in U.S. Pat. No. 3,509,107 phenylphosphonic acid is disclosed to increase the relative viscosity of nylon-6,6.

Finally, in U.S. Pat. No. 3,365,428, including the prior art cited therein, analogous phosphonic acids and salts thereof are disclosed, the patent specifically disclosing the use of such compounds as catalysts for the polymerization of polyamides. (Though not directly relevant, in U.S. Pat. No. 3,825,508, various reducing hydrocarbon-substituted phosphonic and phosphoric acids are proposed for use in the polymerization of a polyamide of a diamine and methyl tere- or iso-phthalic acid, for different purposes.)

The sum teachings of these references may be characterized as emphasizing by far those acids wherein R is a hydrocarbon and not motivating those skilled in the art to do further research with hetero substituted compounds in particular.

Though the specific catalysts employed in the precedingly discussed references increase the rate of the amidation reaction, still better catalysts are always desirable, especially catalysts which are stable, do not interfere with the antioxidants and obtain a linear polymer with as few side chains as possible.

SUMMARY OF THE INVENTION

An object of one aspect of this invention is to provide an improved catalytic amidation process for increasing the molecular weight of polyamides, especially nylon, wherein the rate of amidation is significantly increased.

Upon further study of the specification and appended claims, further aspects and advantages of this invention will become apparent.

To attain the objects of this invention, there is provided a process for increasing the molecular weight of polyamides which comprises heating a polyamide containing terminal carboxy and amino groups in the presence of a sufficient quantity of a phosphonic and/or phosphinic acid catalyst and/or esters thereof to increase the rate of amidation, wherein the improvement comprises employing as the catalyst at least one compound of the formulae:

(A) $R^1(CH_2)_nPO_3R_2^2$ and $R^1(CH_2)_nPO_2HR^2$ where $R^1$ is 2-pyridyl, $NHR^4$ or $NR_2^4$ or $NH_2$, n is an integer of from 2 to 5 inclusive, $R^2$, being the same or different, is H or $C_xH_{2x+1}$, $R^4$, being the same or different, is $C_xH_{2x+1}$, and x is an integer of from 1 to 10 inclusive; and (B) $R^3X(CH_2)_{n'}PO_3R_2^2$ and $R^3X(CH_2)_{n'}PO_2HR^2$ where X is S or O, n' is an integer of from 2 to 5 inclusive, $R^3$ is H or $C_xH_{2x+1}$, x is an integer of from 0 to 10 inclusive and $R^2$ is defined as in formula (A).

These catalysts unexpectedly provide a substantial increase in the rate of amdation as compared to phenylphosphonic acid, for example. In addition, using at least one specific catalyst of the invention, it is seen that polyamides, and nylons in particular, especially nylon-6,6, exhibit a desirably low degree of branching.

DETAILED DISCUSSION

With respect to the (A) catalysts, it is preferred that $R^1$ represents 2-pyridyl, and that $R^2$ represents hydrogen, methyl, ethyl, or n-propyl.

With respect to those catalysts of the invention wherein $R^1$ is 2-pyridyl, it is contemplated that this radical can be substituted by any moiety which does not deleteriously interfere with the advantages of the catalysts of this invention. Examples of such substituted 2-pyridyl radicals include but are not limited to those substituted in the 3, 4, and/or 5 positions with at least one $C_xH_{2x+1}$ group wherein x is an integer from 1 to about 10 inclusive.

With respect to those (A) catalysts wherein $R^1$ is $NHR^4$ or $NR_2^4$, it is preferred that $R^4$ is methyl, both $R^2$ groups are either hydrogen or methyl, and n is 2.

The same non-deleterious type of substitution is also contemplated with respect to the alkylene group bridging the phosphonic and phosphinic acids with the 2-pyridyl group or the $NH_2$ group. Examples of substituted alkylene groups include but are not limited to those wherein one or more hydrogens of the alkylene group is substituted by $C_xH_{2x+1}$ wherein x is an integer from 1 to about 10 inclusive.

Likewise, when the phosphonic and phosphinic acids are esterified, the organic ester portion may also be non-deleteriously substituted. Examples of substituted esters include but are not limited to those wherein one or more hydrogens of the organic ester part of the molecule is substituted by $C_xH_{2x+1}O$ and/or $C_xH_{2x+1}S$ wherein x is an integer from 1 to about 10 inclusive, and/or by unsubstituted phenyl, and/or phenyl substituted by Cl, Br, $R^7O$ and/or $R^7$ wherein $R^7$ is $C_xH_{2x+1}$ wherein x is 1–10.

With respect to the (B) catalysts, it is preferred that $R^3$ represents methyl, X represents sulfur, and $R^2$ represents hydrogen, methyl or ethyl. Another preferred group under (B) occurs when $R^3$ represents ethyl, X represents sulfur and $R^2$ represents hydrogen.

A still further preferred group occurs when $R^3$ represents hydrogen, X represents oxygen and $R^2$ represents hydrogen. In connection with the aforesaid subgeneric groups under category (B), the most preferred species are those wherein n' represents 2, 3 or 4. It is also contemplated that alkylene and ester portions of the molecule may be substituted as above so long as the substituent does not deleteriously interfere with important advantages of the catalyst.

With respect to the compound $R^3X(CH_2)_{n'}PO_2HR^2$ in particular, it is preferred that $R^3$ represents H, X represents oxygen, n'=3 and $R^2$ represents H. Also preferred is $R^3$ and $R^2$=H, X=O, n'=3 with one of the hydrogen atoms of the internal carbon of $(CH_2)_{n'}$ being substituted with $CH_3$.

The preferred catalytic species of this invention, 2-(2'-pyridyl)ethylphosphonic acid, abbreviated herein as "PEPA", not only leads to an increase in the rate of amidation, but it also functions as a chelating agent so as to stabilize cupric antioxidants against precipitation to elemental copper, copper oxide and copper phosphonate solids. Furthermore, PEPA does not hydrolyze to $H_3PO_4$ under polymerization conditions in contrast to the homologue 2-(2'-pyridyl)methylphosphonic acid which does hydrolyze to phosphoric acid. Finally, PEPA is considered to be internally neutralized and is expected to have a minimal effect on acid-base dyeability. A still further advantage of PEPA, when used, for example, with nylon-6,6, is the relatively low degree of branching of the resultant nylon. Finally, PEPA exhibits a relatively low activity with respect to cross-linking reactions (gelation) during the amidation process.

In addition to the highly preferred catalyst 2-(2'-pyridyl)ethylphosphonic acid, other specific catalysts worthy of mention include but are not limited to: 3-(2'-pyridyl)propyl-phosphonic acid, 4-(2'-pyridyl)butyl-phosphonic acid, 5-(2'-pyridyl)amylphosphonic acid, 3-(methylthio)propylphosphonic acid, 3-(ethylthio)propylphosphonic acid, 3-hydroxypropylphosphonic acid, 2-aminoethylphosphonic acid, and diethyl 2-(2'-pyridyl)ethyl-phosphonate, as well as the corresponding phosphinic acid compounds, especially the corresponding 3-hydroxypropylphosphinic acid.

The catalysts used in the process of this invention are either known chemical entities or they can be produced in accordance with conventional processes. A preferred process for making the phosphonic acid catalysts comprises reacting the appropriate halide with an alkyl phosphite (Arbuzov reaction). The compound 2-(2'-pyridyl)ethyl phosphonate was synthesized by the base catalyzed addition of diethylphosphite to 2-vinylpyridine. The synthesis of the latter compound has been disclosed in the following reference: E. Maruszewska-Wieczorkowska, J. Michalski, J. Org. Chem., 23, 1886 (1958).

When $R^1$ is $NHR^4$ or $NR_2^4$, the preferred method of preparing the compounds is to react a dihaloalkane with a trialkyl phosphite according to the Arbuzov reaction to form a haloalkylphosphonate diester and to react same with a mono- or dialkyl amine. The resultant alkylated aminoalkylphosphonate diester may then be hydrolyzed to form the free acid. The following reaction scheme illustrates the preparation, wherein at least one of $R^5$ and $R^6$ represents alkyl, and one of $R^5$ and $R^6$ may represent hydrogen.

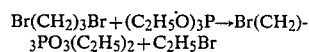

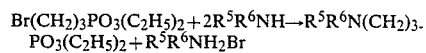

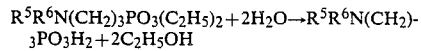

For making the phosphinic compounds, an analogous reaction can be conducted. Also, other processes can be used, as described, e.g., in U.S. Pat. No. 2,648,695. In the latter patent, cyclic derivatives are produced which may be oligomers; however, in the amidation reaction, the cyclic compounds are believed to hydrolyze to form free phosphinic acids.

The polyamides used in the process of this invention are conventional. Preferred polyamides are nylons, including but not limited to nylon-6 and nylon6,6. These and the other nylons known in the field are well described as to structure and manufacture, and for further reference, attention is invited to the patent and general literature, for example, the Kirk-Othmer Encyclopedia of Chemical Technology, 3rd edition, John Wiley and Sons, under the headings "Polyamides", "Polyamide Fibers", and "Polyamide Plastics", as well as the Encyclopedia of Textiles, Fibers and Non-Woven Fabrics, John Wiley and Sons, Inc., 1984, pages 347–380, relating to polyamide fibers. For the purposes of the present invention, nylon-6,6 is the most preferred species.

The catalysts of this invention are preferably used at above the melting temperature of the polyamide, the upper limit being generally dictated by the decomposition temperature of the polymer. In the case of nylon-6,6, the operating temperature is about 265°–300°, preferably 270°–295° C.

Conversely, the catalysts can also be employed below the melting temperature of the polymer, preferably at least 15° C. below the melting point to avoid working with a hard to handle, sticky mass. For example, since nylon-6,6 melts at 260° C., the preferred operating temperature for employing the catalyst below the melting point is 170°–245° C.

The reaction time is sufficient to obtain the desired increase in molecular weight, the preferred reaction time being generally about 1 to 20 minutes. Likewise, the amount of phosphonic and/or phosphinic catalysts employed in the reaction is sufficient to obtain a catalytic effect, the preferred concentration of phosphonic acid, for example, being about ≧1 grammoles of catalyst per million grams of polyamide. Finally, the reaction is conducted preferably in the absence of air, for example, in the presence of an inert gas such as nitrogen.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

Both the catalysts of this invention and comparative catalysts are tested in a thin film polymerizer. This is an apparatus for conducting small scale nylon polymerizations under controlled conditions of temperature, water vapor pressure, and reaction time—in principle all the factors necessary for the determination of amidation kinetics. Essentially, a low molecular weight nylon sample is melted under its equilibrium steam pressure, the steam pressure is reduced, and the reaction quenched before a new equilibrium is attained. By relative viscosity analysis one can then determine how fast the sample approached the new equilibrium and thus amidation kinetics and catalytic factors. An important feature of the thin film polymerizer is that the nylon samples are melted in broad cups, allowing the melt to spread out as a pool 2 mm deep that can respond rapidly to changes in steam pressure.

EXAMPLES 1-7 AND A-H

General Procedure for Determining Increase in Relative Viscosity

Six cups, each containing 1 gram of powdered nylon and the desired amount of catalyst, are placed in a stainless steel sample chamber with 5 ml of water. The nylon samples are melted and brought to reaction temperature as rapidly as possible by dropping the reaction chamber into a preheated 280° C. sand bath. The water begins to evaporate creating a steam atmosphere inside the reaction vessel. A check valve on the reaction vessel maintains a constant steam pressure of 780 mm. When the internal reactor temperature nears 280° C., temperature control for the sand bath is switched to a thermocouple inside the reactor. A total of 45–60 minutes is required to attain a stable operating temperature of 280°±1° C. As soon as the reaction vessel stabilizes at 280°±1° C. the steam pressure is reduced from 780 mm to 100 mm to initiate polymerization. The polymerization is allowed to proceed for the indicated time and is then quenched by rapid cooling. The polymer is chopped to a coarse powder and its relative viscosity is determined in an 8.5% by weight solution of 6,6-nylon in 90% formic acid (balance $H_2O$) at 25° C.

The general procedure outlined above was followed using a catalyst concentration of 10 g moles/$10^6$ grams of nylon-6,6. The reaction time was 5 minutes. The relative viscosity of the nylon polymer prior to reaction was 54.

| Example | Catalyst | Relative Viscosity |
|---|---|---|
| 1 | $R^1(CH_2)_2PO_3H_2$ | 200 |
| 2 | $R^1(CH_2)_3PO_3H_2$ | 215 |
| 3 | $R^1(CH_2)_4PO_3H_2$ | 190 |
| 4 | $R^1(CH_2)_5PO_3H_2$ | 199 |
| 5 | $CH_3S(CH_2)_3PO_3H_2$ | 271 |
| 6 | $CH_3CH_2S(CH_2)_3PO_3H_2$ | 186 |
| 7 | $HO(CH_2)_3PO_3H_2$ | 210 |
| A | $C_6H_5PO_2H_2$ | 147 |
| B | $C_6H_5PO_3H_2$ | 166 |
| C | $R_1PO_3H_2$ | 105 |
| D | $R_1CH_2PO_3H_2$* | — |
| E | $C_6H_5CH_2PO_3H_2$ | 102 |
| F | $C_6H_5(CH_2)_2PO_3H_2$ | 135 |
| G | $C_6H_5(CH_2)_3PO_3H_2$ | 133 |
| H | none | 73 |

*hydrolyzes to $H_3PO_4$
$R^1$ = 2-pyridyl

EXAMPLE 8

General Procedure for Detecting Branching

The melt test for nylon-6,6 branching is based on Instron measurements of shear rate versus shear stress. Plotting the log of shear rate versus the log of shear stress gives straight lines, the slopes of which reflect branching. By adding known amounts of bis(hexamethylene)triamine, the slopes can be related to the moles of branches formed per $10^6$ grams of polymer.

A sample of nylon-6,6 was placed in an autoclave with a catalyst concentration of 10 moles of 2-(2'-pyridyl)ethylphosphonic acid per $10^6$ grams of nylon6,6, 0.107% KI, 0.05% KBr and 0.02% Cu(OAc)2.-$H_2O$ and heated at 280° C. for 5 minutes. The sample was cooled and the shear stress and shear rate were measured. A plot of the log of shear rate versus the log of shear stress gave a straight line with a slope of 0.72. This value corresponds to the formation of an additional 2.5 moles of branches per $10^6$ grams of polymer. This example demonstrates that the resultant nylon has an unexpectedly low degree of branching, noting the following comparative example.

COMPARATIVE EXAMPLE I

Example 8 was repeated using $PhPO_2H_2$ (phenylphosphinic acid) in place of 2-(2'-pyridyl)ethylphosphonic acid. A plot of the log of shear rate versus the log of shear stress gave a straight line with slope 0.68. This value corresponds to the formation of an additional 4.0 moles of branches per $10^6$ grams of polymer. Thus, the use of $PhPO_2H_2$ results in an undesirable 60% increase in branching compared to 2-(2'-pyridyl)ethylphosphonic acid.

EXAMPLE 9

Effect on Antioxidant

A mixture containing 0.025 grams of Cu(OAc)$_2$, 0.25 grams of KI, 0.062 grams of 2-(2'-pyridyl)ethylphosphonic acid and 4.7 grams of $CH_3CH_2CONH(CH_2)_6NHCOCH_2CH_3$ (used here as a model compound for nylon) was heated at 280° C. for one hour under an atmosphere of argon. Only a trace of white precipitate was visible after the allotted time. This example shows that the antioxidant system Cu(OAc)$_2$./KI does not tend to precipitate in the presence of the catalysts of the instant invention, noting the following comparative example which demonstrates a disadvantage of prior systems.

COMPARATIVE EXAMPLE J

Example 9 was repeated using 0.052 g of $PhPO_3H_2$ (phenyl-phosphonic acid) in place of the 0.062 grams of 2-(2'-pyridyl)-ethylphosphonic acid. A heavy white precipitate was formed immediately. This type of precipitate can cause a problem with filters in the system.

EXAMPLE 10

Stability of Catalysts 2-(2'-pyridyl)ethylphosphonic acid, water and n-propylproprionamide (a model compound for nylon) were heated for 1.5 hours at 260° C. The solution was cooled and examined by $^{31}P$ NMR. There was no evidence for the formation of $H_3PO_4$, which presence would have meant that the phosphonic acid has been hydrolyzed by water and lost to the system, a phenomenon associated with other systems, as demonstrated by the following comparison.

COMPARATIVE EXAMPLE K

Example 10 was repeated using p-methoxyphenylphosphonic acid in place of 2-(2'-pyridyl)ethylphosphonic acid. Examination of the resulting solution by $^{31}P$ NMR showed that 85% of the p-methoxyphenylphosphonic acid was hydrolyzed to $H_3PO_4$.

EXAMPLE 11

Effect of Catalyst on Cross-Linking (Gelation)

Samples of nylon-6,6 were prepared, each containing 10 moles/$10^6$ g of ethyl 2-(2'-pyridyl)ethylphosphonate or phenylphosphinic acid catalyst. These samples were heated to 283° C. under steam and then a vacuum of 0.5 mm Hg pulled. Samples were withdrawn after 5, 10, and 20 minutes and relative viscosities measured.

| Time (min.) | Relative Viscosity | |
| --- | --- | --- |
| | $R^1(CH_2)_2PO_3(C_2H_5)_2$ | $C_6H_5PO_2H_2$ |
| 0 | 54 | 58 |
| 5 | 354 | 207 |
| 10 | 566 | 527 |
| 20 | 919 | gel |

$R^1$ = 2-pyridyl

The pyridyl ester gives significantly faster amidation with less catalysis of crosslinking (gel formation) than does $C_6H_5PO_2H_2$.

EXAMPLE 12

The general procedure of Examples 1-7 was followed using $H_2N(CH_2)_2PO_3H_2$ at a catalyst concentration of 10 moles/$10^6$ grams of nylon-6,6. The relative viscosity of the nylon polymer prior to reaction was 50. After 5 minutes of reaction the relative viscosity increased to 186.

EXAMPLE 13

The general procedure of Examples 1-7 was followed using an oligomer/cyclic ester of 3-hydroxypropylphosphinic acid which was expected to hydrolyze to the free acid. The concentration, based on the free acid, was 10 moles/$10^6$ grams of nylon-6,6. The relative viscosity of the nylon polymer prior to reaction was 59. After 10 minutes of reaction, the relative viscosity increased to 225. Under the same conditions, using phenyl phosphinic acid, the relative viscosity was only 210.

The oligomer/cyclic ester of this example was prepared by the following method: A pressure tube was charged with 56 g of sodium hypophosphite, 34 ml of allyl alcohol, 100 ml of methyl alcohol, and 1.5 g of Lupersol TM 101 (peroxide initiator). The mixture was heated for 5 hours at 130.C. Residual allyl alcohol and methyl alcohol were removed using a rotary evaporator under vacuum. The residue was treated with 84 ml of concentrated hydrochloric acid, and the remaining water and hydrochloric acid removed using a rotary evaporator under vacuum. The crude material was rapidly vacuum distilled at 120°-125° C. with a short column and then carefully redistilled at 84° to 94° C. at 0.01 mm, to give 3.6 g of a near glassy oligomer/cyclic ester of the desired 3-hydroxypropylphosphinic acid. (Caution should be exercised during this distillation because of a rapid exotherm which occurs and results in the polymerization of a significant amount of the product.) The reaction product is characterized as an oligomer because during the first distillation, the NMR values remained constant while the viscosity of the product increased.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. For example, functional acid derivatives and sources of acid or ester are contemplated as equivalents of the above-described catalysts. Also, mixtures of catalysts are contemplated.

What is claimed is:

1. In a process for increasing the molecular weight of a polyamide, comprising heating the polyamide in the presence of a catalyst to effect a desired increase in molecular weight, the improvement, wherein the catalyst is at least one compound of the formulae:
    (A) $R^a(CH_2)_nPO_3R_2^b$ or $R^a(CH_2)_nPO_2HR^b$ where $R^a$ is 2-pyridyl, $NHR^c$ or $NR_2^c$ or $NH_2$, n is an integer of from 2 to 5 inclusive, $R^b$, being the same or different, is H or $C_xH_{2x+1}$, $R^c$, being the same or different, is $C_xH_{2x+1}$, and x is an integer of from 1 to 10 inclusive; or
    (B) $R^dX(CH_2)_{n'}PO_3R_2^b$ or $R^dX(CH_2)_{n'}PO_2HR^b$ where X is S or O, n' is an integer of from 2 to 5 inclusive, $R^d$ is H or $C_xH_{2x+1}$, x is an integer of from 0 to 10 inclusive and $R^2 R^b$ is defined as in formula (A).

2. A process according to claim 1, wherein the catalyst is of the formula $R^1(CH_2)_nPO_3R_2^b$, and $R^1$ represents 2-pyridyl.

3. A process according to claim 2, wherein $R^6$ is H, $CH_3$, $C_2H_5$ or n-$C_3H_7$.

4. A process according to claim 2, wherein $R^a$ represents 2-pyridyl and $R^6$ represents H.

5. A process according to claim 2, wherein $R^b$ represents methyl.

6. A process according to claim 2, wherein $R^b$ represents ethyl.

7. A process according to claim 2, wherein $R^b$ represents n-propyl.

8. A process according to claim 3, wherein n is 2.

9. A process according to claim 1, wherein the catalyst is of the formula (B).

10. A process according to claim 9, wherein $R^d$ represents methyl or ethyl, X is S, and $R^b$ is H, methyl or ethyl.

11. A process according to claim 9, wherein $R^d$ is H, X is O, and $R^b$ is H.

12. A process according to claim 10, wherein $R^d$ is methyl or ethyl and $R^b$ is H.

13. A process according to claim 10, wherein $R^d$ is methyl and $R^b$ is methyl or ethyl.

14. A process according to claim 1, wherein the catalyst is 2-(2'-pyridl)ethylphosphonic acid, 3-(2'-pyridyl)propyl-phosphonic acid, 4-(2'-pyridyl)butylphosphonic acid, 5-(2'-pyridyl)amylphosphonic acid, 3-(methylthio)propylphosphonic acid, 3-(ethylthio)propylphosphonic acid, 2-aminoethylphosphonic acid, ethyl 2-(2'-pyridyl)ethylphosphonate or 3-hydroxypropylphosphinic acid.

15. A process according to claim 1, wherein the catalyst is 2-(2'-pyridyl)ethylphosphonic acid.

16. A process according to claim 1, wherein the catalyst is $R^dX(CH_2)_{n'}PO_2HR^b$ wherein $R^d$ is H and X is O.

17. A process according to claim 1, wherein the catalyst is 3-hydroxypropylphosphinic acid 18. A process according to claim 1, wherein the polyamide is a nylon.

19. A process according to claim 1, wherein the polyamide is nylon-6,6 or nylon-6 or a blend thereof.

20. A process according to claim 2, wherein the polyamide is nylon-6,6.

21. A process according to claim 14, wherein the polyamide is nylon-6,6.

22. A process according to claim 15, wherein the polyamide is nylon-6,6.

23. A process according to claim 16, wherein the polyamide is nylon-6,6.

24. A process according to claim 17, wherein the polyamide is nylon-6,6.

* * * * *